United States Patent [19] [11] 4,326,155
Griebeler [45] Apr. 20, 1982

[54] SHOCKWAVE PROBE

[76] Inventor: Elmer L. Griebeler, 5111 W. Doherty Rd., West Bloomfield, Mich. 48033

[21] Appl. No.: 155,944

[22] Filed: Jun. 3, 1980

[51] Int. Cl.³ .......................................... G05B 19/33
[52] U.S. Cl. .................................... 318/576; 318/645; 73/587; 73/597; 73/602; 73/620; 367/906; 367/119; 367/127; 367/161; 367/163; 367/180; 367/103; 367/95
[58] Field of Search ............... 318/576, 577, 640, 645, 318/638; 367/906, 119, 127, 160, 161, 163, 180, 151, 95, 96, 97, 98, 103; 73/587, 596, 597, 602, 620

[56] References Cited

U.S. PATENT DOCUMENTS

| 2,434,143 | 1/1948 | Chilowsky | 367/160 |
| 2,743,429 | 4/1956 | Erdman et al. | 367/127 |
| 3,497,731 | 2/1970 | Straube | 367/160 |
| 3,775,582 | 11/1973 | Iceland | 318/640 |
| 3,821,469 | 6/1974 | Whetstone et al. | 367/906 |
| 3,893,342 | 7/1975 | Florian et al. | 73/517 R |
| 4,012,588 | 3/1977 | Davis et al. | 367/127 |

Primary Examiner—J. V. Truhe
Assistant Examiner—Eugene S. Indyk
Attorney, Agent, or Firm—Patrick H. Hume

[57] ABSTRACT

Probe method and means are disclosed for guiding and positioning a robot-actuated tool, such as a gripper or a welding head, through at least one transceiver for generating and sensing focused shockwaves, the probe being associated with the tool for relative movement with respect to the object or objects being sensed, without physically contacting the same.

20 Claims, 8 Drawing Figures

SHOCKWAVE PROBE

BACKGROUND OF THE INVENTION

1. Field of Invention

The present invention relates to probes and sensory guides for robot-actuated tools, such as grippers, welding heads, positioning, metering and counting devices, etc., that perform a control function without physically contacting the workpiece being sensed.

2. Description of the Prior Art

Systems are well known wherein sensing devices locate a workpiece or zone (work), and effect relative positioning between the work and a tool for performing an operation thereon, by comparative intelligence that is translated into a control function by which optimum relative positioning is sought to be achieved and maintained. Probes that physically contact the work and follow its contours to cause a tool to track through mechanical (including hydraulic and fluid) and electrical (including magnetic and electronic) linkages, are distinguished from contactless probes of present concern. The Zeewy et al. U.S. Pat. No. 3,883,956, exemplifies such physical probes as applied to a welding operation. A downwardly-biased finger probes the groove or joint to be welded. During relative movement between finger and groove, variations in the latter cause the finger to move, which produces voltages that are translated into movement of the responding welding torch in a duplicate pattern that, ideally, tracks the groove being welded. Such systems are marked by significant disadvantages: finger probes deteriorate due to weld-spatter, and intense heat, consequent upon proximity to the welding zone. More remote spacing greatly increases the complexity and cost of such systems when designed to offset the aggravated geometric problems. Good practice dictates, therefore, that the probe be positioned as closely as possible to the tool, in a lead or advance location to the latter relative to the work, to minimize tracking errors without deleterious exposure to itself, or interference with the tool in performing the work to be done. Contactless probes commend themselves as best suited to achieve these ends.

Many forms of contactless probes are known to the prior art. Among these is the optical approach disclosed by Stanley, U.S. Pat. No. 3,009,049, employing a television monitor in a welding operation, which is subject to disadvantages of damage to the optical system from heat and spatter, as well as aberrations arising from flickering of the welding arc, glowing of the molten metal, and obscuration by flux in the seam ahead of the torch. These variables exact much sophistication to interpret correctly the work conditions, and to implement the necessary controls in the performance of the work to be done, so as to reduce the usefulness of such optical sensors to the simplest applications.

In another welding adaptation, Sullivan, U.S. Pat. No. 3,480,756, employs magnetic sensors to position a welding head with respect to a seam to be welded between which relative movement occurs. Magnetic systems lack the precision and general range of usefulness of the optical sensors, being, as they are, limited to certain magnetic materials, usually ferrous welding operations, being insensitive to small or sudden changes in the welding path unless too close to the heat of the torch to preserve the probe's integrity, or so close as to interfere with the welding itself.

In my prior pending application, Ser. No. 11,176, filed Feb. 12, 1979, for "Wavicle Probe", there is disclosed a probe that guides a welding torch through ultrasonic signals beamed at the joint to be welded, the echoes from which are translated into an electric signal to which robot means for controlling the welding torch responds to cause the latter to track the welding path without physical contact with the workpiece. This is, essentially, an acoustical method for producing an echo in which the elapsed time between sending the acoustic signal, and the reception of its echo, is compared with a pre-selected standard, and torch controls are made to respond to comparative differences thus detected. My prior application defines "wavicle" as "a short burst of ultrasonic signal travelling as a substantially discrete package through the space intervening between the transmitting means and the target surface." (Page 6, lines 4-7.) "Ultrasonic" is then defined as "frequencies of a sonic nature, but above normal human hearing range: generally, this range encompasses frequencies above about 20 kilohertz (KHz), and preferably above about 50 kilohertz (KHz)." (Page 6, lines 12-14.)

While ultrasonic echo devices exemplified by my earlier wavicle, contactless probe inventions, as disclosed in said patent application, identified above, afford many advantages over other prior art devices, some of which devices are discussed above, certain disadvantages have been revealed therein as well. Among these are limited accuracy, and sensitivity to extraneous noises. The limitation on accuracy is, in part, due to the characteristic in such an acoustical system, by definition, to detect acoustical waves that lie beyond an initial oscillatory cycle, thus, introducing uncertainty and the possibility of error up to one wavelength. The first cycle received starts from zero amplitude, with considerable interference from extraneous noise, and increases in amplitude within the next few cycles, with the result that the accurate location of any point on the first cycle is obscured. This problem can not be solved through the use of higher frequencies, due to the fact that the ambient atmosphere readily absorbs frequencies not greatly exceeding 100 KHz.

SUMMARY OF PRIOR ART AND POINT OF DEPARTURE

From the foregoing discussion of prior art contactless probes, it is apparent that they share in common the use of radiant energy in some form that is translated into useful intelligence by which control means, as a robot, is caused to direct a tool in the performance of an intended function. Successful application depends upon the form of the energy employed, and the clarity and selectivity of the signals it generates, essentially immune to interference from extraneous influences in the environment of application, that translate into the control function with precision, sensitivity, and criticality. The present invention deals entirely with novel energy and signal propagation in the field of contactless probe sensors and tool guidance that are vastly superior to any known prior art systems, some of which are discussed above.

SUMMARY OF THE INVENTION

The present invention pertains to probe means and method for generating a shockwave, especially a focused shockwave, representing a substantially unitary, abrupt pressure-change, propagated through the ambient atmosphere, in which sonic vibrations are suppressed, and for sensing a reflection of the shockwave rebounding from a surface of the work being sensed; differentiating the initial shockwave time/pressure parameters with those of the shockwave reflection, and translating the parametric differences into reflection-time related voltage, to permit positioning a tool in response to such voltage.

DESCRIPTION OF THE PREFERRED EMBODIMENTS

Figure 1:
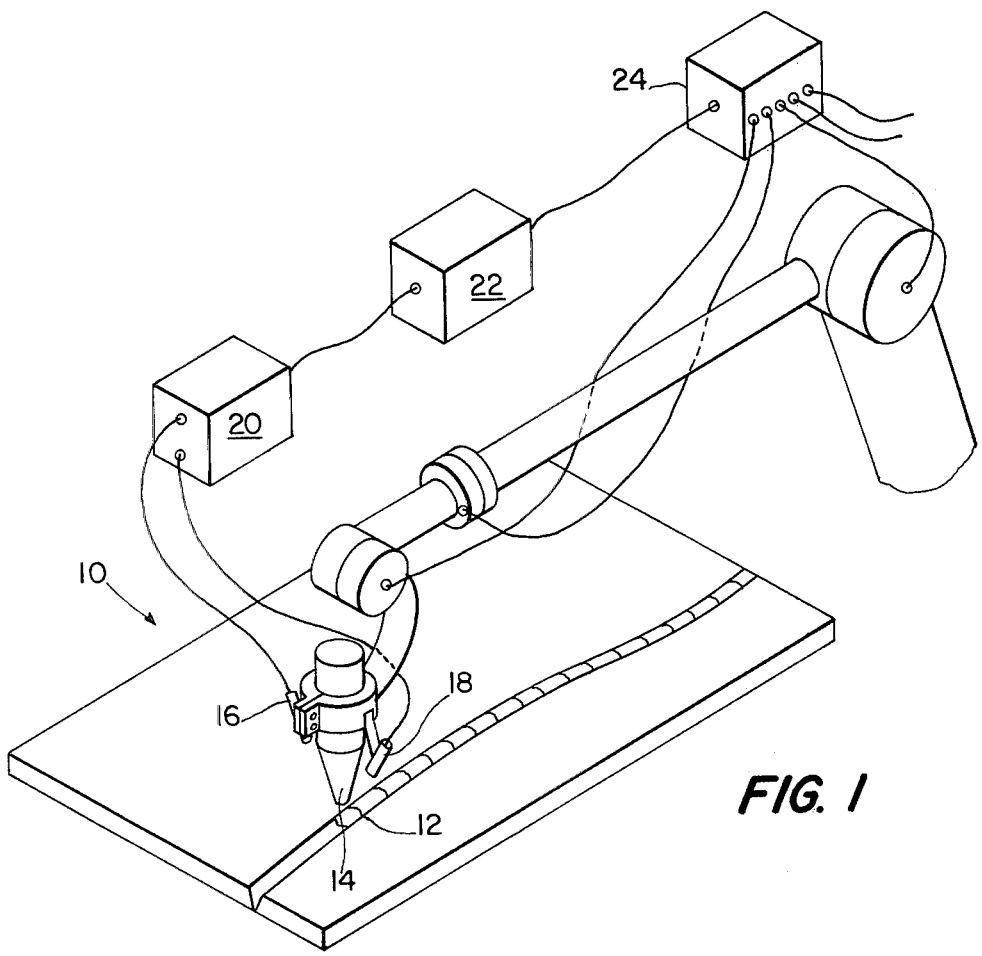
FIG. 1 is a schematic perspective view of a portion of a welding robot system showing a probe of the present invention in a preferred position for guiding the welding torch.

Preferred embodiments of the invention comprise means and method for sensing, without physically touching, the location and shape of one or more objects, including grooves or seams in an object, by the use of a small shockwave, generated and focused by a variety of ways and means, as described hereinafter, that is reflected off of the object(s) being sensed, the reflected image being intercepted and compared as to time and-/or pressure difference with the original shockwave, with this intelligence then being translated into a recognition or position signal.

The term "shockwave", as used herein, is defined as a compression wave in the ambient atmosphere formed by a generating surface's being moved from a position of rest to a position of maximum displacement (usually of some micrometric value) at a speed in excess of that at which the ambient atmosphere can transmit sound (acoustical waves) and being held in the displaced position, at least momentarily; said compression wave having a disturbed region of small but finite thickness within which very abrupt changes in pressure, density, and velocity occur within the ambient atmosphere, defining a single, steep-faced wave front, followed by a less steep, though rapidly decaying gradient.

The shockwave is demonstrably different from prior contactless probes in that the effective pulse is non-repetitive, as opposed to the repetitive wave cycles inherent in the energy forms utilized by probes of the prior art, i.e., light waves, magnetic and electrical pulses, and the wavicle ultrasonic pulsations in air. The atmosphere surrounding the shockwave probe propagates and concentrates a sudden pressure change into a shockwave having a width that is but a fraction of the wavelength of the highest ultrasonic frequency of sound that air is capable of propagating. On the other hand, the width of a wavicle consists of many repeated component wavelengths. Thus, the shockwave provides greatly improved accuracy, resolution, and separation between multiple reflections from one or plural reflecting surfaces.

It must also now be apparent that the shockwave probe, in its singular pulse per transceiver cycle, affords no standing wave implicit in harmonic systems, and can use no horn or wave-guide discussed in my prior applications.

The property of the ambient atmosphere to propagate and concentrate an abrupt pressure change into a shockwave is believed to be a function of the following dynamic conditions:

A radiating compression wave (see definition of "shockwave", above) is followed by an immediate attenuation gradient from the highest to the lowest pressures, with corresponding drops in density and velocity of the entrained gases, on the trailing side of the wave. Because the atmosphere resists the propagation of the compression wave at rates exceeding its ability to propagate sound waves through its mass, the compression wave develops a steeper front of greater amplitude normal to the radii of propagation at a maximum advancement rate beyond which it cannot go, while its trailing components, having attenuated to a speed and rarefaction of less resistance, tend to overtake the steep front and join it. This tends to reduce the speed at which the compression wave front is propagated through the ambient atmosphere, causing a pressure drop, further steepening the front, and narrowing the integrated pressure pulse into a shockwave.

Shockwaves normally weaken due to the spreading of the compression front, both radially and in amplitude, representing ever increasing frictional resistance. By focusing the shockwave according to the present teachings, its energy may be concentrated and maintained far longer than the norm, so that its reflection (reflected image) is much crisper in definition and resolution as to its comparative values of time and pressure with those of the generating shockwave, than is possible with a group of waves, or cyclic wave patterns that characterize the wavicle probe, and other probes of the prior art.

In the drawings, FIG. 1 depicts a welding robot 10 welding a seam 12 with a welding head or torch 14. Probes 16 and 18, as shown, can be used in one of two ways: (1) the probe 16 can be a shockwave transmitter, and probe 18 the receiver of the reflected image of the shockwave (or vise versa), in which case, the control box 20 would contain a single transmitter driver, a single receiver amplifier, a step recognition circuit, a vertical height comparator, and a horizontal scan circuit to locate and optimize the position of the probes in relation to the groove of the seam 12, where the reflected shockwave is weakest, or on the edge of the groove where the reflection begins to weaken; (2) the probes 16 and 18 can each be transceivers, wherein probe 16 intercepts its shockwaves reflection off of the far side (probe 18's side) of the V-groove comprising the seam 12 to be welded, while probe 18 intercepts its wave's reflected image in the same way from probe 16's side of the V-groove 12. In this second example, control box 20 would contain two transmitter drivers, operable in alternation so as not to interfere with or confuse the signal received by the opposing, momentarily inactive, probe, two receiver amplifiers, two step recognition circuits, and two step translators by which the times to image interception between the two probes may be equated or differentiated. Any difference can then be triangulated as between the two probes and the welding seam, so that the axis coordinator 22 can command the drivers in box 24 to energize the robot 10 to correct the position errors, and balance the system. In both cases, the welding torch is accurately positioned with respect to the seam to be welded to perform the welding operation, and is maintained in such position during relative movement between the seam and the torch, notwithstanding geometric variations.

The electronic components 20, 22 and 24 are well known to those who are skilled in this art, and need no further description or explanation, beyond their general functions, inasmuch as they do not, per se, constitute a part of the present invention.

Figure 2:
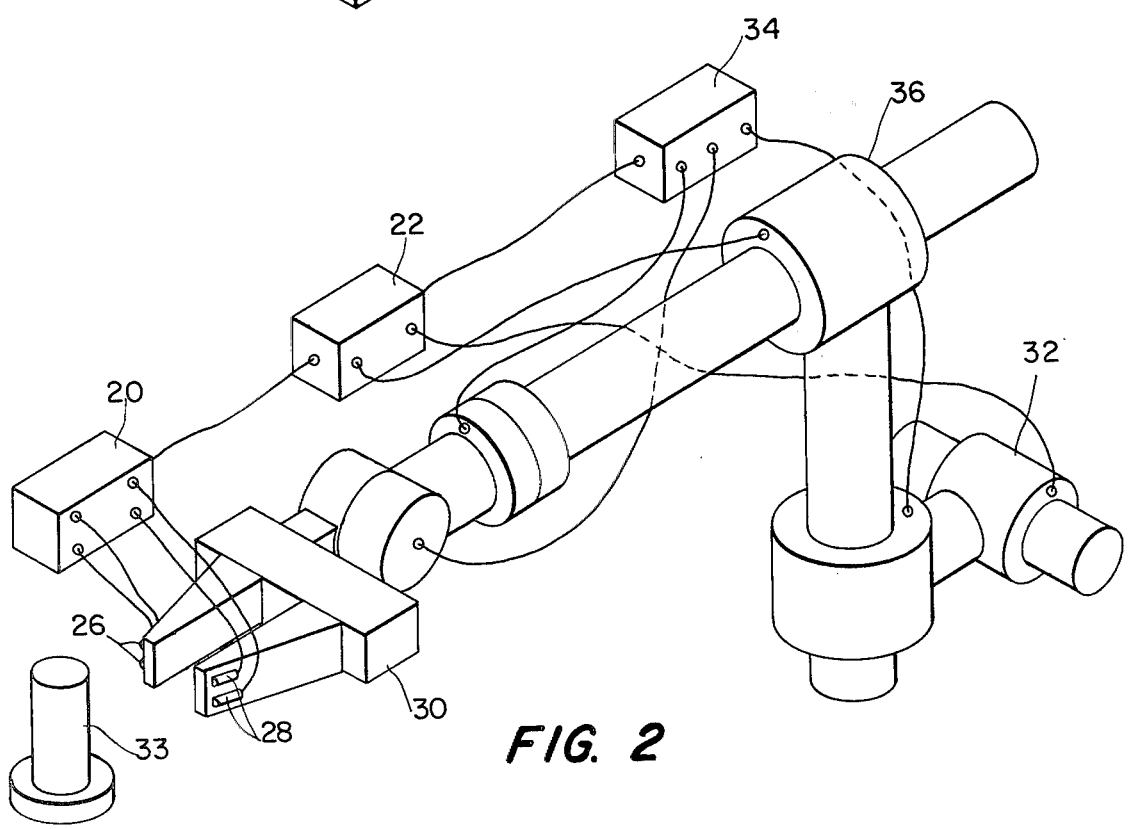
FIG. 2 is another perspective view similar to FIG. 1 of a linear slide system with a gripper guided by two probes of the present invention toward an object to be grasped.

FIG. 2 shows a pair of shockwave probes 26, and a second pair of shockwave probes 28, applied to a gripper 30, of a linear slide device 32, to guide the gripper 30 in its movement toward an object 33 to be handled. Linear slide devices are frequently applied in materials handling, welding, and torch-cutting usages, so that the illustrated configuration should be taken as an example without limitation. Control box 20 then provides signals directly to drivers in box 22 to move the left/right slide 32 until the distances to the object 33 from the probes 26 and 28 match. The actual in/out position matches with the inward-moving commanded position to, in turn, control the position of the in/out slide 36, to tell the sequence control box 34 the precise location of the object 33.

Figure 3:
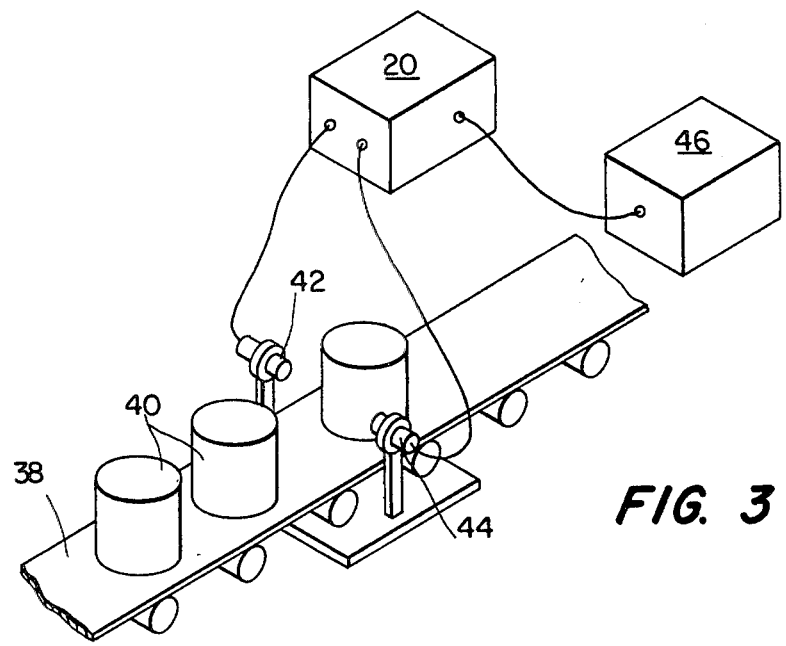
FIG. 3 is still another schematic perspective view of a conveyor system having a probe of the present invention for detecting articles being conveyed thereon.

FIG. 3 depicts a conveyor 38 moving parts 40 past probes 42 and 44, as opposed to the probes moving with respect to the parts or work-object, as in the preceding examples. Also, as previously described, the probes 42-44 can be transceivers for sensing the extent the parts 40 might be off-center on the conveyor 38, or, if center-aligned, by difference of the distance-signals in the control box 20, measuring the width of the parts 40. Alternatively, one of the probes 42-44 can be a transmitter, and the other a receiver, to detect each part 40 at the position where it eclipses the shockwave emitted from the transmitting probe, so as to prevent its reaching the receiving probe. In this instance, control box 20 would signal sequence control box 46 to count the part, or signify that the part is in position to undergo some ensuing programmed operation farther along down the line.

SHOCKWAVE GENERATION

Various means to generate shockwaves in the ambient atmosphere might suggest themselves to those skilled in the art, any of which might be adapted to the uses and intentions of the within described invention. Practically, such means can take the form of polarizing or depolarizing means driving armatures or diaphragms, with or without mechanically imposed bias, in response to a sudden high energy input or withdrawal, to displace an armature or diaphragm at supersonic speed. Atmospheric gas in contact with the armature or diaphragm is likewise displaced at a rate in excess of its capability to conduct sound waves, and such displacement pulse becomes a compression wave or shockwave, as discussed above. Electromagnetic means and armatures energized by suddenly imposed high voltages are among such shockwave generators. Piezoelectric materials, crystalline substances that develop an electrical field when subjected to physical pressure, and manifest mechanical deformation when subjected to an electric field, so useful in frequency control and electro-acoustical applications, are another source of shockwave generation when adapted to the present invention. The convenience, practicality, accessibility, and relatively low cost, of piezo crystals strongly commend them for the purposes herein disclosed.

The piezoelectric effect is found only in crystals that have no center of symmetry, e.g., quartz, Rochelle salt, and many synthetic polycrystalline ceramics of principal concern here. Piezoceramics are manufactured from suitable dielectric material, e.g., barium titanate, or lead zirconate titanate, that is first molded, then fired at high temperature, and then cooled under the influence of a strong direct current (dc) electric field. This polarizes the ceramic and imparts the piezoelectric properties. The small amplitude of physical deformation (typically $10^{-6}$ meter at an applied voltage of $10^4$ volts) can be greatly enhanced by applying the piezoelectric material in what is known as the bender mode. The basic bender comprises two piezoelectric components of opposite polarity, usually of disc or wafer-like configuration, bonded together, so that, when voltage is applied, one of the components contracts, while the other expands. As in a bimetallic strip when heated, the overall displacement of the whole bender assembly under applied voltage is quite large. The basic mode of flexure of the circular disc bender is from planar to concavo-convex, depending upon the polarity of the voltages applied. Bender discs may be mounted or supported at their edges, or at their node, which, in a freely oscillating disc bender, lies on a concentric circle inwardly of its edge a distance equal to approximate one-eighth of the disc's diameter. The foregoing general principles will aid in understanding the specific application of a piezoelectric bender in carrying out the present invention, particularly as a generator of shockwaves, and a receiver of the reflected image or echo of such shockwaves.

Figure 4:
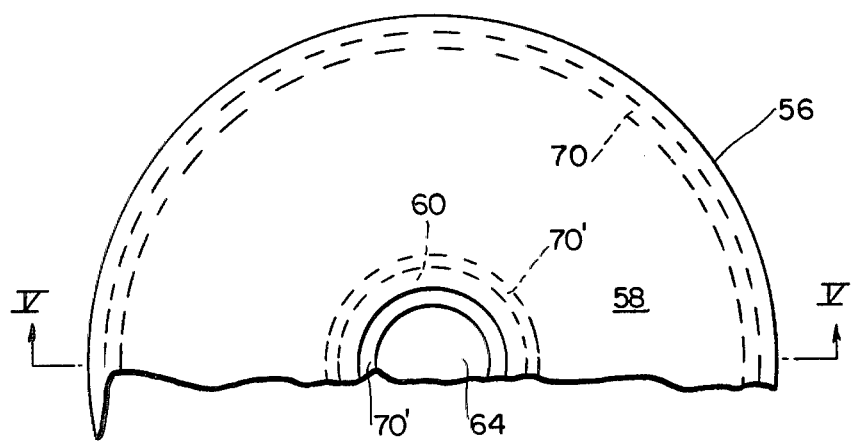
FIG. 4 is a half-plan top view of a probe and mount of right-cylindrical configuration, made in accordance with the present invention.
Figure 5:
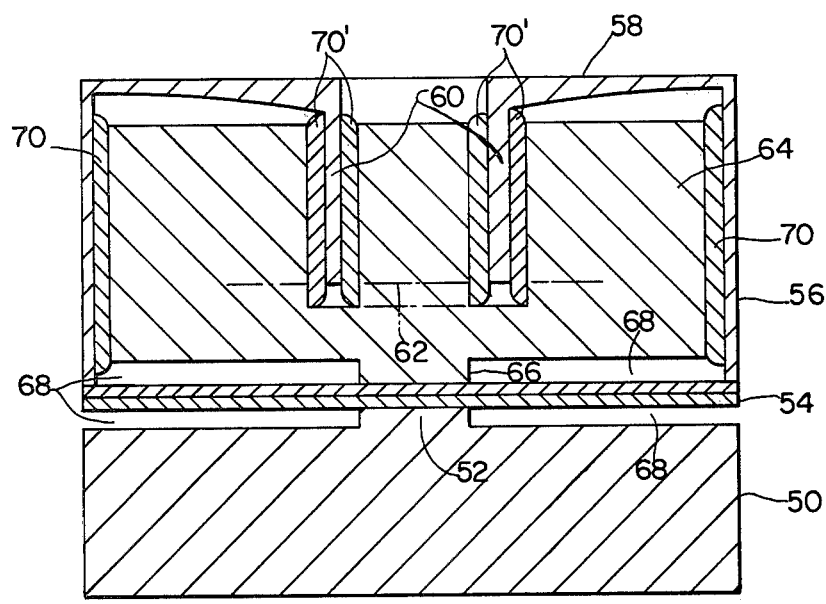
FIG. 5 is a vertical sectional elevational view of the probe depicted in FIG. 4, taken along any diametric plane, as line V—V of FIG. 4.
Figure 6:
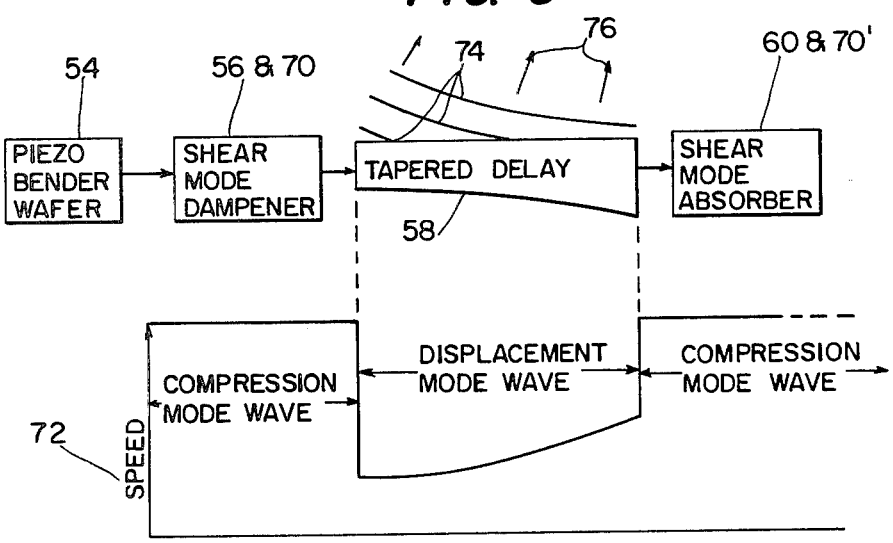
FIG. 6 is a diagrammatic functional equivalent of the probe of FIG. 5, schematically depicting its operational characteristics to generate and focus shock waves.

FIGS. 4, 5, and 6 relate to a piezoelectric bender type of probe having a configuration and functional capability well adapted to the purposes of the present invention. As will appear, the manner in which the piezobender disc is mounted generates shockwaves that are frontally spherically concave so as to converge upon the focal point of the sphere. In a preferred embodiment, the piezobender disc is mounted at its center, with its edge being connected to the edge of a radiating disc that generates a concave, converging wavefront, as the shockwave from the piezobender disc travels toward its center where a dampener absorbs its residual energy.

In FIGS. 4 and 5, a circular, relatively massive base 50 has a centrally-disposed upstanding pedestal 52 that constitutes a solid support to which a piezobender disc 54 is anchored. A cylindrical shell of lightweight material comprises sidewall 56 that is bonded at its lower (as illustrated) edge to the outer edge of the bender disc 54, and at its upper edge is formed to constitute, or is otherwise connected to, a radiating annulus or disc 58. The annulus or disc 58 is of minimum thickness adjacent the sidewall 56, and gradually increases in thickness to its inner end from which depends a concentric cylindrical sleeve or inner wall 60, that is integral with, or otherwise connected to, the annular disc 58, and which extends into the chamber defined by the sidewall 56 in coaxial relation therewith to a plane of termination 62 that lies in spaced relation above, and essentially parallel to, the upper surface of the bender disc 54.

The chamber formed by the sidewall 56 is filled with an internal mass 64 that suggests a mirror-image of the base 50, with a depending pedestal 66 matching the lower pedestal 52 to confine the bender-disc 54 therebetween. The heighth of the pedestals 52 and 66 are substantially equal so as to provide annular clearance spaces 68 above and below the centrally supported bender-disc 54 outwardly to its edge to allow for oscillatory movements in its unsupported or unconfined portions. The mass of the base 50 combined with the internal mass 64 within the sidewall 56 afford sufficient resistance by way of inertial counter force to offset or absorb reactionary movement resulting from the piezo-action of the bender-disc 54. In addition to the masses 50 and 66, an optional damping material 70—70', e.g., silicone grease, may be injected further to reduce detrimental vibrations.

The piezo-bender disc 54 is distorted from its deenergized planar state into a concavo-convex saucer shape when electrical voltage is passed between its surfaces, causing the sidewall 56 to move responsively in an axial direction in shear to the damping material 70, and generating an inwardly-moving concentric compression wave or ripple-like displacement in the surface of the radiation annular disc 58. The ambient atmosphere in contact with the surface 58 is compressed or rarefied by such displacements to form a radiating wavefront that is first emitted adjacent the outermost circumference of the annular disc 58, progressing inwardly toward the center as the generating displacement does. The gradual thickening of the annular disc 58 towards its center causes the generating displacement to diminish in amplitude and accelerate in its rate of travel toward center, which exacts a corresponding configuration in the radiating wavefront that approximates a segment of a sphere having a focal point in space toward which the wavefront is propagated that is distant about eight (8) times the diameter of the annular disc 58. When the generating displacements reach the inner edge of the annular disc 58, they enter the cylindrical sleeve 60 as rapidly moving compression waves that are dissipated in the movement in shear of the sleeve 60 with respect to damping material 70'.

The foregoing may be visualized by reference to the graphics of FIG. 6. The graph 72 plots the velocity of the compression waves or shockwaves 74 as the vertical ordinate, showing their speed (the higher above the baseline the greater the speed) of propagation through the system. Only one shockwave is present at any given time. The energy input by the bender-disc 54 is modified by the shear mode damper 56 and 70, the tapered delay of the annular disc 58, and the inner shear mode absorber 60 and 70'. The slower displacement mode wave (center plot, graph 72) is carved-out of the rapidly moving compression mode wave that begins and ends the process. Spherical wave fronts 74 are thus generated and directed, as illustrated by radial arrows 76, toward the focus of the sphere (not shown).

Figure 7:
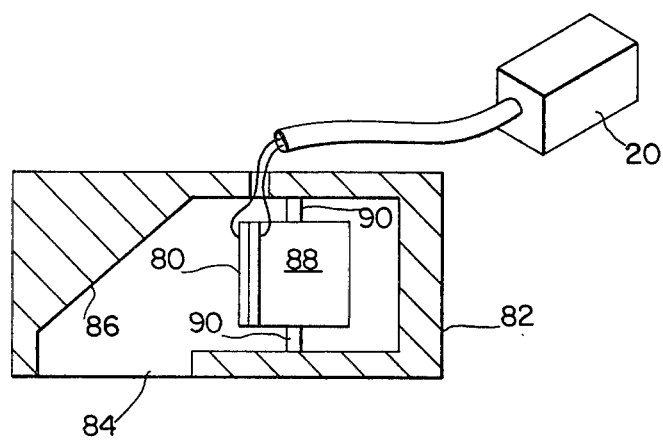
FIG. 7 is a longitudinal sectional elevational view of one probe assembly, made in accordance with the present invention, in which an angularly-disposed reflecting surface is interposed between the probe and the surface of the work being scanned.

FIG. 7 depicts, in longitudinal vertical section, means for mounting a transmitter, or a receiver, or a transceiver, wherein the piezo bender-disc 80 is enclosed within a shielding boxlike covering 82 having a scanning aperture 84 angularly disposed relative to the effective transceiving axis of the bender disc. Although any suitable angularity compatible with practicality may be employed, the configuration shown in FIG. 7 provides for 90 degrees with a reflecting surface 86 disposed at 45 degrees to beam of shockwaves from the bender 80 through the aperture 84 to a focal point on the work being scanned, and to return the echo wave along the same path back to the bender 80. The bender disc 80 is preferably mounted against damping material 88 to reduce ultrasonic vibrations, and the bender assembly 80, 88 is mounted by resilient mounts 90 to avoid conductance of shockwaves to or from the boxlike covering 82. This is one way to protect the piezo elements from intense heat, or heavy weld spatter, or to direct shockwaves to and from work location that might otherwise be blocked or inaccessible. Absent such requirements, the straightline direct approach is to be preferred.

Figure 8:
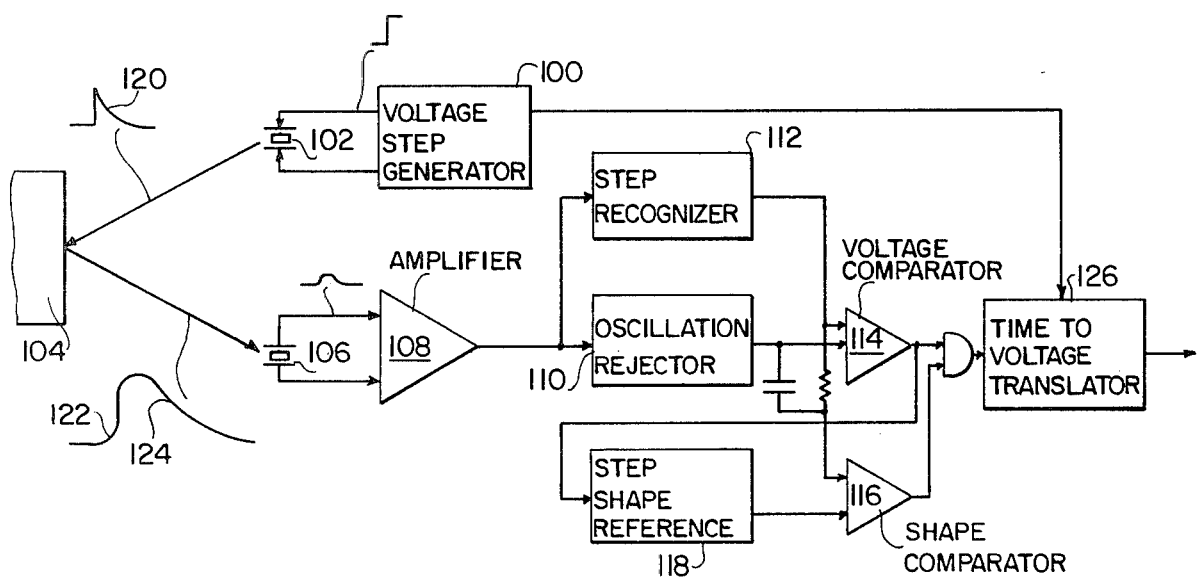
FIG. 8 is a block diagram that schematically represents a preferred backup circuit for implementing the intended functions of probes according to the present invention.

FIG. 8 is a block diagram of a circuit useful in the operation of a probe in accordance with the present invention, for generating, sensing, and translating a shockwave, which diagram is offered as an example without limitation for purposes of illustration only:

A voltage step generator 100, known to those skilled in the art, produces an occasional, sudden, moderately high voltage change across a transmitter piezo-bender 102. This causes the disc 102 suddenly to change shape, which, in turn, causes a sudden compression or attenuation of the transmitting medium, such as the ambient atmosphere. This compression or attenuation radiates, or is transmitted, as a shockwave through the medium, and is reflected by the object 104 to be sensed back to the receiving piezo-disc 106. Normally, the received shockwave is very weak, and should be amplified by an amplifier 108. Under some conditions, the received shockwave will be sufficiently strong for reception by the transmitting disc 102, thus, saving the cost of the receiver 106 and its support system.

Continuing the reference to FIG. 8, after amplification at 108, the return signal passes through circuitry 110 to reject any oscillatory components in the signal, as known to those skilled in the art, thereby eliminating any interference from sonic or ultrasonic vibrations. A step recognizer 112 records the pressure just before the shockwave, and just after the sudden rise of the shockwave, to provide a threshold voltage half-way between the recorded values, so that a voltage comparator 114 reliably and accurately trips, upon receiving the reflected shockwave, on the same point of the sudden pressure rise of the originally-transmitted shockwave, independently of the amount of its attenuation or diffusion. This is one of the reasons why the present invention is far more accurate than its acoustical counterparts.

In many cases, a comparator 116 is useful to compare the shape of the received shockwave with a predetermined shape reference 118 (which may be any one of several known systems for this purpose) in order to ascertain that the received shockwave is from the intended object, or part thereof. The shape of the received shockwave is determined, in part, by the shape and texture of the object being sensed, and, in part, by the inevitable tapering-off 120 of the shockwave behind its front, as well as the inevitable gradual diffusion of the shockwave front both forward (122) and behind (124). Finally, a time-to-voltage translator 126, also known to those skilled in the art, converts the reflection time into a voltage value that represents the distance between piezo-discs 102 and 106 and the object 104 being sensed.

While the probe herein described is adequate for positioning a robot-controlled tool in many applications, it is also true that a plurality of probes, or a multiple probe complex, will permit control of additional positioning axes, such as, fore-and-aft position, fore-and-aft tilt, side-to-side position, side-to-side tilt, as well as object (including grooves) size. Where multiple probes are used, the paired transmitter and receiver discs should be triggered one at a time to avoid one probe's confusing another.

It is also within the contemplation of this invention that some of the receivers in some applications be set-up to receive reflections originating from more than one transmitter, simultaneously or sequentially; conversely, in other applications, that one or more transmitters be set up to send reflections to more than one receiver, simultaneously or sequentially, for the purpose, in either case, of gaining additional information about the location or shape of an object being sensed, or to distinguish the object being sensed from surrounding objects.

The foregoing detailed description shall be regarded as illustratory rather than definitive in determining the scope of the present invention, which shall not be limited thereby other than as accords with the appended claims.

I claim:

1. In a control system for a tool-positioning robot, a work-sensing probe that senses the locus of work to be performed, including the loci of a continuum of such work, without physically contacting the work, comprising
means for generating a focused shockwave,
means for receiving the reflection of a focused shockwave,
means for differentiating the time/pressure parameters of the original shockwave from those of its reflection,
and means for translating the observed parametric differences into an electric signal within the control system to direct the robot to position the tool at the sensed locus of the work.

2. The invention of claim 1, in which the means for generating a shockwave includes a piezoelectric component.

3. The invention of claim 1, in which the means for receiving the reflection of a shockwave includes a piezoelectric component.

4. The invention of claim 2, in which the piezoelectric component is a piezo-bender disc.

5. The invention of claim 3, in which the piezoelectric component is a piezo-bender disc.

6. The invention of claim 1, in which the shockwave generating- and reflection-receiving means are combined as a transceiver.

7. The invention of claim 6, in which the transceiver includes a piezoelectric component.

8. The invention of claim 7, in which the piezoelectric component is a piezo-bender disc.

9. The invention of claim 1, in which the differentiating means and translating means includes step-recognizer means for noting the pressure immediately before and after the shockwave to provide a threshold voltage intermediately of the noted pressure values, and voltage comparator means responsive to said threshold voltage.

10. The invention of claim 9, further including means for comparing the characteristics of the received reflection of a shockwave with those of a preselected reference standard.

11. The invention of claim 1, in which the translating means includes a time-to-voltage translator that converts the time between shockwave generation and the reception of its reflection into a voltage value.

12. The invention of claim 11, in which the voltage value represents the distance between the tool and the sensed locus of the work.

13. The invention of claim 1, in which the means for generating a shockwave has means for focusing the shockwave associated with it.

14. The invention of claim 2, including means for focusing a generated shockwave.

15. The invention of claim 4, including means for focusing a generated shockwave.

16. The invention of claim 6, in which the transceiver is associated with means for focusing a generated shockwave.

17. The invention of claim 15, including a statically inert mass for mounting the piezo-bender disc at its center, said mass having annular clearance spaces for the disc freely to oscillate in response to impressed voltage, a radiating surface activated by the disc to generate focused shockwaves in the ambient atmosphere, and means for damping and absorbing residual and extraneous vibrations that are not components of a generated shockwave.

18. The invention of claim 17, in which the radiating surface produces a spherical shockwave that radiates in converging relation to a remote focal point.

19. The method of sensing the presence and location of an object, without physically contacting it, that includes generating a focused shockwave, beaming the shockwave with the object at the focus of the shockwave so that a sufficient amount of the energy of the shockwave is reflected from it, receiving the reflection, and translating the parameters of time, distance, and pressure difference of the shockwave and its reflection into an electric signal.

20. The method of claim 19, which includes effecting relative positioning between the sensed object and a work zone in response to the electric signal.

* * * * *